Dec. 14, 1965      D. P. RUTTER ETAL      3,222,777

METHOD FOR FORMING A MITER JOINT FOR PIPE INSULATION

Filed Sept. 12, 1961      2 Sheets-Sheet 1

INVENTOR.
DONALD P. RUTTER
BY ANTHONY E. CIMOCHOWSKI

John A. McKinney

ATTORNEY

Dec. 14, 1965   D. P. RUTTER ETAL   3,222,777
METHOD FOR FORMING A MITER JOINT FOR PIPE INSULATION
Filed Sept. 12, 1961   2 Sheets-Sheet 2
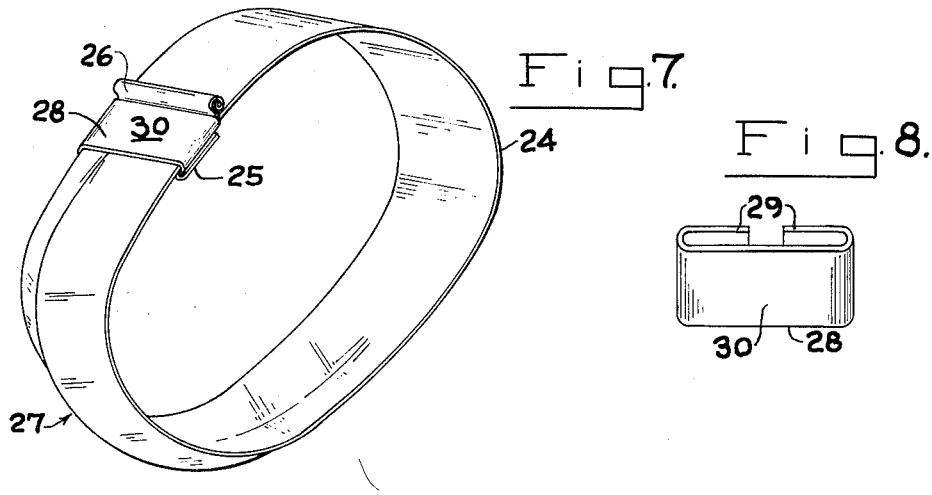
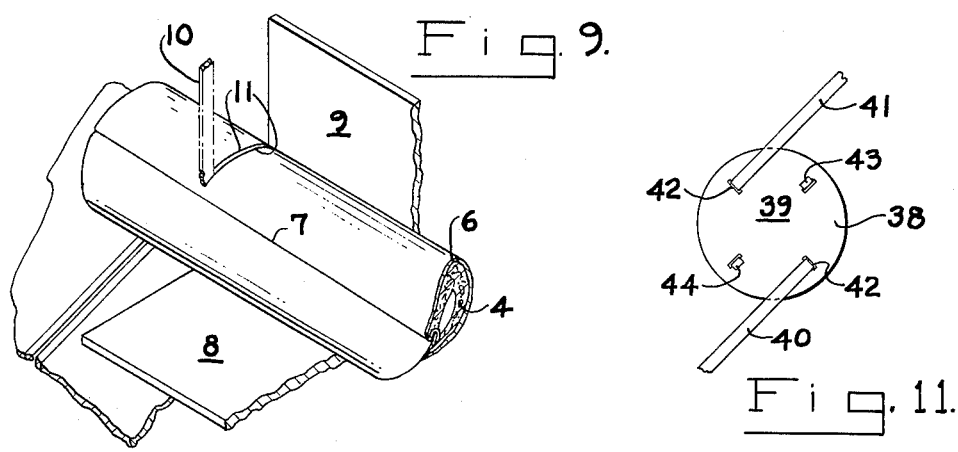
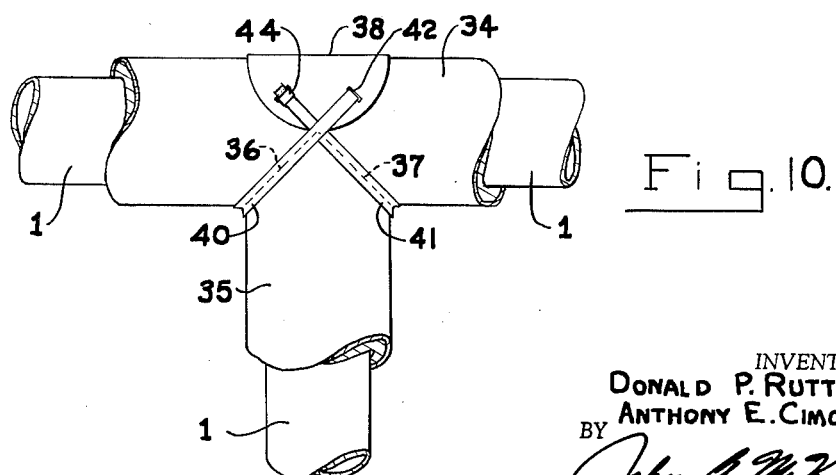
INVENTOR.
DONALD P. RUTTER
ANTHONY E. CIMOCHOWSKI
BY
ATTORNEY

United States Patent Office 3,222,777
Patented Dec. 14, 1965

3,222,777
METHOD FOR FORMING A MITER JOINT
FOR PIPE INSULATION
Donald P. Rutter, Bernardsville, and Anthony E. Cimochowski, Somerville, N.J., assignors to Johns-Manville Corporation, New York, N.Y., a corporation of New York
Filed Sept. 12, 1961, Ser. No. 137,565
4 Claims. (Cl. 29—526)

This invention relates to methods for jacketing elbows and bends in a pipeline by forming a miter joint for the pipe insulation and miter joints for pipe insulation utilizing such methods. The instant invention is particularly directed to provide miter joints for metallic covered pipe insulation wherein the miter joint is of a type that may be readily opened so that the pipeline may be inspected or repaired and also so that the insulation on the elbow or bend of the pipeline is harmonious with the insulation covering the other portions of the pipeline.

For many years, one of the problems existing in the field of providing neat appearing and adequate insulation for pipelines was in covering the necessary angular bends and elbows in the pipeline. The types of insulation for such installations always entailed time-consuming efforts to build up several laminated layers of material which were not readily removable or in other instances involved expensive fittings of formed insulation which were not harmonious with the remaining portions of the pipeline.

A primary object of the instant invention is to provide insulation for jacketing elbows or bends in a pipeline wherein the insulation may be readily assembled or disassembled.

A further object of the instant invention is to provide insulation for jacketing elbows or bends in a pipeline wherein the insulation covering the elbow or bend in the pipeline is harmonious with the remaining portions of the pipeline.

The foregoing objects are accomplished in accordance with the instant invention by providing a metal jacketed insulation for covering pipelines. Miter joints, provided in accordance with the instant invention, allow the metal jacketed insulation to accommodate the necessary elbows or bends in the pipeline with insulation that is consonant to the insulation covering the other portions of the pipeline. In accordance with the instant invention, the adjacent ends of adjacent sections of pipe insulation for use at the elbow or bend in the pipeline are mitered so as to form at least a portion of the angle covered by the elbow or bend. Also, the adjacent mitered edges are complimentary so that the adjacent peripheries of the adjacent sections of insulation are contiguous to each other. A metallic strip, preferably comprising a soft aluminum alloy having a desired elongation characteristic, is then positioned around the miter joint formed by the adjacent edges of the pipe insulation so as to cover the miter joint formed by the adjacent ends of the pipe insulation. Contractive forces are then applied to the ends of the metallic strip so that the metallic strip is moved into contiguous relationship with the adjacent peripheral surfaces of each adjacent end of the pipe insulation. A readily releasable clip is provided for releasably securing the adjacent ends of the metallic strip in assembled position around the miter joint.

The invention will be more fully understood and further objects and advantages thereof will become apparent when reference is made to the following detailed description of a preferred embodiment of the invention and the accompanying drawings in which:

FIGS. 1–4 illustrate steps in the method of forming a miter joint in accordance with the instant invention;

FIGS. 5 and 6 disclosed other types of miter joints formed in accordance with the disclosure of the instant invention;

FIG. 7 is a pictorial representation of one type of metallic strip disclosed in the instant invention;

FIG. 8 is a pictorial representation of a clip as disclosed in the instant invention;

FIG. 9 is a pictorial representation of a piece of pipe insulation being subjected to a miter saw table; and FIGS. 10 and 11 illustrate another modification of the invention.

Figure 1:
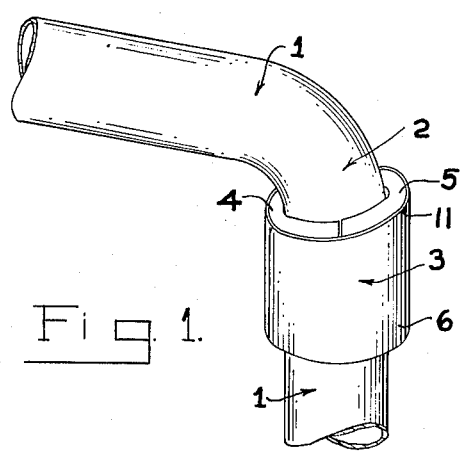

FIGS. 1–4, inclusive, illustrate the steps in the method of providing a pipeline 1 and particularly an angular bend 2 thereof with a metal jacketed pipe insulation. The first section 3 of pipe insulation comprises two semi-cylindrical pieces 4 and 5 of a pipe insulating material. The insulating material utilized with the instant invention may be any of the conventional fibrous or non-fibrous, rigid or non-rigid pipe insulating materials but in the preferred embodiment comprises a rigid pipe insulating material such as that manufactured and marketed as a staple article of commerce by Johns-Manville Corporation under the trade designation "Thermobestos." As illustrated specifically in FIG. 9, the pieces 4 and 5 of pipe insulating material are encased in a metal jacket 6 which in the preferred embodiment comprises an aluminum alloy. Also, in the preferred embodiment, the pieces 4 and 5 of thermal insulating material are secured to the metallic jacket 6 so that the metal jacket may be opened along a longitudinal seam line 7 and snapped into position around the pipe. As illustrated in FIG. 9, a section of pipe insulation is positioned on a conventional miter saw table 8 against a retaining wall 9 positioned at a predetermined angle to the direction of the relative movement between the saw blade 10 and the table 8 so that the saw blade 10 passes through the section of insulation to form a miter end 11 cut at a predetermined angle to the longitudinal axis of the pipe insulation. After being cut, the section 3 is opened along the longitudinal seam line and snapped into position around the pipeline as illustrated in FIG. 1.

Figure 2:
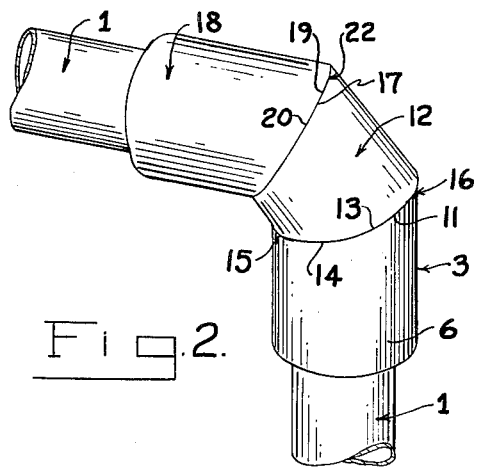

A second section 12 of pipe insulation is then cut on a miter saw table 8 at each end thereof so as to provide mitered ends thereon and in particular a miter end 13 which is complementary to the miter end 11. As illustrated in FIG. 2, the second section 12 is snapped around the angular bend 2 of the pipeline 1 with the miter end 13 in contiguous relationship with the miter end 11 so as to form a miter joint 14 having a throat portion 15 and a peak portion 16. The maximum and minimum extent in a longitudinal direction of the second section 12 is obtained from a predetermined table depending on the number of joints to be utilized to make the angular joint 2 and the size of the pipe as related to the particular size of insulating material. As described above, the second section 12 is provided with another miter end 17 for a purpose to be later described.

Figure 3:
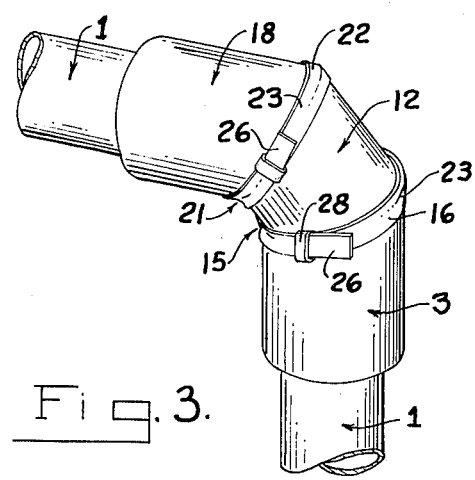

As illustrated in FIGS. 2 and 3, a third section 18 of pipe insulation having a miter end 19, formed in the manner described above so as to be complimentary to the miter end 17, is snapped into position around the pipe and moved into a position wherein the miter end 19 is contiguous to the miter end 17 to form a miter joint 20 having a throat portion 21 and a peak portion 22. As illustrated particularly in FIG. 2, the angular bend has now been provided with thermal insulating material but it is now necessary to provide the miter joints between the sections of insulation with a covering to protect the insulating material from any deleterious elements. Since the pipeline has been provided with a metal jacketed insulation, it is most desirable to provide a metal cover for the miter joint between adjacent sections of insulation. To fit the miter joint perfectly, the covering material would have to be elliptical in shape and portions thereof would have to change in axial cross section from a convex configuration to a concave configuration to match the peak and throat portions of the miter joint. To seal such a type of joint it is particularly important that the convex portion thereof have a good fit but in some instances the concave portion thereof may comprise a band that bridges over the angle formed at the throat portion of the miter joint.

As illustrated in FIG. 3, a first band 23 covers the miter joint 14 and a similar band 23 covers the miter joint 20. In the preferred embodiment of the instant invention, each band is of the type illustrated in FIG. 7 and comprises a metallic strip 24 having ends 25 and 26 with an arcuate portion 27 nearer the end 25. The arcuate portion 27 extends a predetermined distance about the periphery of the band 23 formed by the metallic strip 24 and its extent is dependent upon the peak portion of the miter joint to be accommodated. Also, the arcuate section is drawn into the band 23 so as to be convex in axial cross section. As illustrated in FIG. 7, the convex portion is of varying radii with the smallest radius thereof at approximately the center point of the arcuate portion 27. The metallic strip 24 may be formed of any type of metal that possesses the desired physical characteristics, to be explained below, such as an aluminum alloy or stainless steel, or other similar types of material. The ends 25 and 26 of the metallic strip 24 are joined by a clip 28 with the end 25 being passed through the clip 28 and then folded back around the inner extremities 29 of the clip. The other end 26 passes through the clip 28 in a direction opposite to that direction of the end 25 so as to be sandwiched between the outer portion 30 of the clip 28 and the portion of the metallic strip 24 adjacent the end 25. The portion of the metallic strip 24 adjacent the end 26 thereof is rolled upon itself by a conventional tool 31, illustrated particularly in FIG. 4, comprising a ratchet handle 32 and a working stud 33. This tool 31 cooperates with the clip 28 to provide means for applying appropriate forces to the strip 24 to position the strip 24 in proper orientation relative to the miter joint. Also, the clip 28 cooperates with the rolled end 26 to lock the strip 24 in its finally adjusted position.

The instant invention functions to provide an angular bend in a pipeline with the proper type of thermal insulating material in the following manner. For illustration purposes only, the following explanation will be directed to a thermal insulating material comprising a rigid, molded pipe insulation, of the type described above, attached to a metal jacket so that the metal jacket may be opened along a longitudinal seam line and snapped into position around the pipe. However, it is to be readily understood that the concepts disclosed in the instant application may be utilized with other types of thermal insulating materials. Also, the instant invention is particularly directed to providing miter joints for pipe insulation either wherein the pipe insulation has an outside diameter less than twelve inches or wherein the angle accommodated by two adjacent sections of pipe insulation is greater than 30°. The number of sections for forming the particular angular bend are formed from straight pieces of pipe insulation as described above. The number of sections utilized is dependent upon the size of the pipe, the thickness of the insulation, the radius of the bend, and the particular angle to be covered. It is desirable to utilize the minimum possible number of pieces in the angular bend so as to minimize the number of cuts to form the miter ends of insulation and the number of bands to be utilized. Two is the smallest number of pieces possible for any size. As the pipe size and the radius of curvature of the angular bend becomes larger, more sections are utilized. For example, in the illustrations of FIGS. 3, 4 and 5, two, three and four sections of insulation are used.

Figure 4:
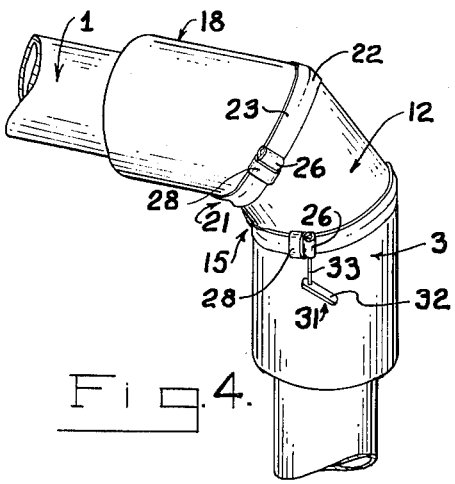
Figure 6:
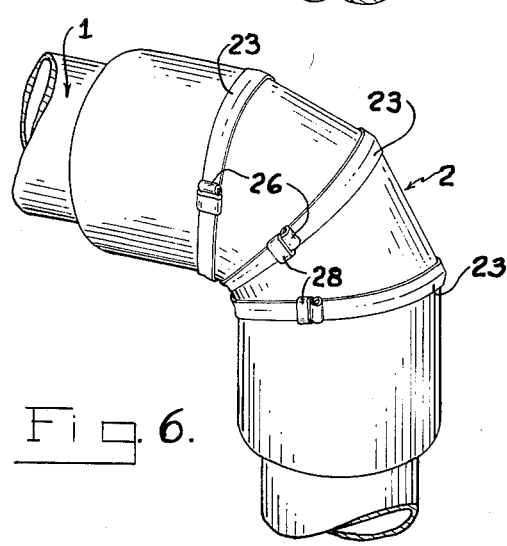
Figure 5:
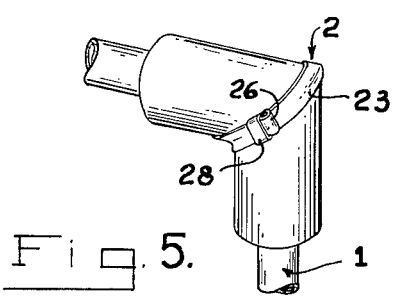

In the embodiment of FIGS. 1–4, the pipe has a diameter of approximately 4″ and an angular bend of 90°. Three sections of pipe insulation are provided with complimentary ends, formed on a miter saw table as described above, wherein the angular ends of each section of pipe insulation have been cut at approximately 22½° to the longitudinal axis of the pipe insulation. As illustrated in FIGS. 1–4, inclusive, the first, second and third sections, 3, 12 and 18 are spread open along the longitudinal seam lines 7 and snapped into position around the pipeline at the angular bend 2 to be accommodated. Prior to positioning of the pipe insulation on the pipeline, the portion of the thermal insulating medium adjacent the area of each section to be associated with the throat portion of the angular bend 2 of the pipeline is routed out to allow room for the walls of the pipeline. This is only necessary when the insulating material is a rigid, molded material but since this portion is located on the curved portion of the pipeline to be accommodated, the thermal insulating properties of the insulating media are not diminished. The first and second sections 3 and 12 are positioned so as to form the miter joint 14 having a throat portion 15 and a peak section 16. The second and third sections 12 and 18 are positioned so as to form the miter joint 20 having a throat portion 21 and a peak portion 22. In installations wherein it is considered advisable, a ribbon comprising an appropriate sealing compound is then placed over each miter joint 14 and 20. The miter joint is then provided with a metallic strip 24 having the proper arcuate portion 27 as illustrated in FIG. 7. The metallic strip 24 is positioned loosely around the miter joint 14 and an end 25 of the strip is passed through the clip 28 and bent back upon itself over the extremities 29 of the clip. The other end 26 is passed through the clip 28 between the outer portion 30 of the clip 28 and the end 25 of the metallic strip 24. The end 26 of the metallic strip 24 is then rolled upon itself by the working stud 33 of the tool 31 to initially position the metallic strip 24 about the miter joint 14. The arcuate portion 27 is then positioned over the peak portion 16 and contractive forces are applied to the end 26 of the metallic strip 24 through the tool 31 as illustrated in FIG. 4. Sufficient forces are applied to the end 26 to draw the metallic strip 24 into close contiguous relationship with the portions of the sections 3 and 12 adjacent the miter joint 14 so that the inner surface of the portion of the metallic strip 24 adjacent the peak portion 16 is convex in axial cross section and the inner surface of the portion of said metallic strip 24 adjacent the throat portion 15 is concave in axial cross section. The metallic strip 24 is retained in its adjusted position by the frictional forces acting between the rolled end 26 and the clip 28. The miter joint 20 is provided with a metallic strip 24 in the same manner as that described relative to the miter joint 14.

It is noted that FIG. 4 illustrates the method of applying a metallic strip 24 which is provided with an arcuate portion 27 whereby the contractive forces are applied first to that portion of the strip 24 associated with the throat portion 15 or 21. However, for some types of insulations, particularly the larger diameter pipe, it is not necessary to preform the strips 24 with an arcuate portion 27. However, when a metallic strip of this nature is applied to the miter joint, it is necessary to reverse the relative position between the clip 28 and the free end 26 of the metallic strip so that the contractive forces are applied first to that portion of the strip 24 adjacent the peak portion 16 or 22.

In order that the metallic strip 24 be able to function to produce the desired results, each strip 24 in the instant invention is formed from a soft aluminum alloy which will readily conform to the contours of the miter joint so as to provide a portion, convex in axial cross section, adjacent to the peak portion of the miter joint and a portion, concave in axial cross section, adjacent the throat portion of the miter joint. Aluminum within the alloy range having an elongation characteristic of at least 30% has the desired physical chracteristics and in the preferred embodiment of the instant invention an aluminum having an alloy of 1100–0 is utilized. Each strip is between .010 and .065 inch in thickness and between ½ and 3 inches in width. In the preferred embodiment, the strip 24 is aluminum having an alloy of 1100–0 and is 0.030 inch in thickness and 1.5 inches in width.

The concepts of the instant invention may also be utilized to provide metallic coverings for miter joints in other locations in a pipeline such as T's and Y's FIGS. 10 and 11 illustrate such application in providing a T in a pipeline 1 with insulation. A section 34 of pipe insulation forming the head of the T is cut on a saw table of the type illustrated in FIG. 9 to provide the section 34 with an opening having miter edges adapted to be butted against complimentary miter edges formed on a section 35 of pipe insulation forming the stem of the T to form the miter joints 36 and 37. A saddle 38, as illustrated in FIG. 11, comprising a base 39 and metallic strips 40 and 41, comprising a soft aluminum alloy having elongation characteristics of the type as explained above, is used to cover the miter joints 36 and 37. The base 39 is provided with a pair of slots 42 for receiving and securing one end of each of the strips 40 and 41. At predetermined locations, the base 39 is also provided with a pair of clips 43 and 44, similar to clip 28, for receiving the other ends of each of the strips 40 and 41. As illustrated particularly in FIG. 10, the saddle 38 is positioned on the outer periphery of the section 34 of pipe insulation. One end of each strip 40 and 41 is secured in position by passing a portion thereof through the slot 42 so as to be positioned between the base 39 and the outer peripheral surface of the section 34. Each strip 40 and 41 is then wrapped around the miter joint and the other end of the strip 40 is passed through the clip 43 and the other end of the strip 41 is passed through clip 44 so that each strip has a pair of edges extending generally in a circumferential direction. The sections of the other ends of the strips 40 and 41 which have been passed through the clips 43 and 44 are then rolled upon themselves by the tool 31 as explained above. The forces applied to the strips 40 and 41 through the tool 31 draw the strips 40 and 41 into close substantially continuous contiguous relationship with the portions of the sections 34 and 35 adjacent the miter joints 36 and 37. The bands 40 and 41 are retained in their adjusted position by the frictional forces acting between the rolled end of the bands and the clips 43 and 44.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. Method for providing a miter joint with a metallic cover comprising:
    (a) forming a miter joint comprising at least two pieces of pipe insulation having adjacent mating surfaces shaped to form a desired angular bend in a pipeline,
    (b) providing a metallic strip having a longitudinal extent many times greater than its transverse extent and having longitudinally extending edges,
    (c) said metallic strip having at least some portions wherein the transverse cross-sectional configuration is substantially planar,
    (d) wrapping said metal strip around said miter joint so that said metallic strip covers said miter joint throughout its full circumferential extent,
    (e) drawing said longitudinal edges of said metallic strip into substantially continuous and contiguous relationship throughout their circumferential extent with the outer surfaces of said pieces of pipe insulation adjacent said miter joint by applying a force to at least one end of said metallic strip, and
    (f) elongating said metallic strip in directions generally parallel to its longitudinal extent and changing said transverse cross-sectional configuration of at least some of said portions from planar to arcuate by applying sufficient force to said one end of said metallic strip.

2. Method for providing a miter joint with a metallic cover comprising:
    (a) forming a miter joint comprising at least two pieces of pipe insulation having adjacent mating surfaces shaped to form a desired angular bend in a pipeline,
    (b) said miter joint having an inner throat portion and an outer peak portion,
    (c) providing a metallic strip having a longitudinal extent many times greater than its transverse extent and having longitudinally extending edges,
    (d) forming a first portion of said metallic strip into a configuration adapted to cover and mate with said outer peak portion,
    (e) said metallic strip having at least some portions wherein the transverse cross-sectional configuration is substantially planar,
    (f) wrapping said metallic strip around said miter joint so that said metallic strip covers said miter joint throughout its full circumferential extent, and so that said first portion of said metallic strip covers and mates with said outer peak portion,
    (g) drawing said longitudinal edges of said metallic strip into substantially continuous and contiguous relationship throughout their circumferential extent with the outer surfaces of said pieces of pipe insulation adjacent said miter joint by applying a force to at least one end of said metallic strip, and
    (h) elongating said metallic strip in directions generally parallel to its longitudinal extent and changing said transverse cross-sectional configuration of at least some of said portions from planar to arcuate by applying sufficient force to said one end of said metallic strip.

3. Method for providing a miter joint with a metallic cover comprising:
    (a) forming a miter joint comprising at least two pieces of pipe insulation having adjacent mating surfaces shaped to form a desired angular bend in a pipeline,
    (b) said miter joint having a inner throat portion and an outer peak portion,
    (c) providing a metallic strip having a longitudinal extent many times greater than its transverse extent and having longitudinally extending edges,
    (d) forming a first portion of said metallic strip into a configuration adapted to cover and mate with said outer peak portion,
    (e) said metallic strip having at least some portions wherein the transverse cross-sectional configuration is substantially planar,
    (f) wrapping said metallic strip around said miter joint so that said metallic strip covers said miter joint throughout its full circumferential extent, and so that said first portion of said metallic strip covers and mates with said outer peak portion,
    (g) retaining one end of said metallic strip in a fixed position adjacent the side wall of said pieces of pipe insulation adjacent said miter joint,
    (h) drawing said longitudinal edges of said metallic strip into substantially continuous and contiguous relationship throughout their circumferential extent with the outer surfaces of said pieces of pipe insulation adjacent said miter joint by applying a force to at least one end of said metallic strip, and
    (i) elongating said metallic strip in directions generally parallel to its longitudinal extent and changing said transverse cross-sectional configuration of at least some of said portions from planar to arcuate by applying sufficient force to said one end of said metallic strip, (j) applying said force in a direction so that said force acts first on the portion of said metallic strip adjacent said inner throat portion.

4. Method for providing a miter joint with a metallic cover comprising:

(a) forming a miter joint comprising at least two pieces of pipe insulation having adjacent mating surfaces shaped to form a desired angular bend in a pipeline, said miter joint having an inner throat portion and an outer peak portion, (b) providing a metallic strip having a longitudinal extent many times greater than its transverse extent and having longitudinally extending edges, (c) said metallic strip having at least some portions wherein the transverse cross-sectional configuration is substantially planar, (d) wrapping said metallic strip around said miter joint so that said metallic strip covers said miter joint throughout its full circumferential extent, (e) retaining one end of said metallic strip in a fixed position adjacent the side walls of said pieces of pipe insulation adjacent said miter joint, (f) drawing said longitudinal edges of said metallic strip into substantially continuous and contiguous relationship throughout their circumferential extent with the outer surfaces of said pieces of pipe insulation adjacent said miter joint by applying a force to at least one end of said metallic strip, and (g) elongating said metallic strip in directions generally parallel to its longitudinal extent and changing said transverse cross-sectional configuration of at least some of said portions from planar to arcuate by applying sufficient force to said one end of said metallic strip.

(h) applying said force in a direction so that said force acts first on the portion of said metallic strip adjacent said outer peak portion.

References Cited by the Examiner

UNITED STATES PATENTS

| | | | |
|---|---|---|---|
| 24,840 | 7/1859 | Bedell | 285—183 |
| 193,170 | 8/1877 | Lauby | 285—183 |
| 388,260 | 8/1888 | Carey | 285—47 X |
| 394,479 | 12/1888 | Evans. | |
| 809,963 | 1/1906 | Loughman | 138—161 |
| 1,077,741 | 11/1913 | Neveu | 285—179 |
| 1,768,584 | 7/1930 | Eaglesfield | 126—114 |
| 2,324,181 | 7/1943 | Tulien | 138—161 |
| 2,725,079 | 11/1955 | Streed et al. | 138—140 X |
| 3,000,433 | 9/1961 | Kemper | 138—147 |

FOREIGN PATENTS

| | | |
|---|---|---|
| 480,579 | 10/1849 | Canada. |
| 65,607 | 11/1892 | Germany. |
| 181,627 | 2/1907 | Germany. |
| 541,951 | 12/1941 | Great Britain. |
| 458,967 | 8/1950 | Italy. |

CARL W. TOMLIN, *Primary Examiner.*